(12) United States Patent
Tsai et al.

(10) Patent No.: US 8,290,092 B2
(45) Date of Patent: Oct. 16, 2012

(54) DIGITAL DEMODULATING APPARATUS FOR TIMING ERROR DETECTION

(75) Inventors: Chin-Jung Tsai, Tainan County (TW); Jeng-Shiann Jiang, Tainan County (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 592 days.

(21) Appl. No.: 12/469,029

(22) Filed: May 20, 2009

(65) Prior Publication Data

US 2010/0296569 A1  Nov. 25, 2010

(51) Int. Cl.
*H04L 27/00* (2006.01)
(52) U.S. Cl. ........................................................ 375/326
(58) Field of Classification Search ................. 375/316, 375/322, 324, 326, 340, 341
See application file for complete search history.

(56) References Cited

U.S. PATENT DOCUMENTS

| | | | |
|---|---|---|---|
| 6,850,493 B1* | 2/2005 | Ojard et al. | 370/252 |
| 7,228,465 B1* | 6/2007 | Hedger | 714/701 |
| 2003/0182618 A1* | 9/2003 | Chen et al. | 714/794 |
| 2004/0258184 A1* | 12/2004 | Liu et al. | 375/350 |

* cited by examiner

*Primary Examiner* — Kevin M Burd
(74) *Attorney, Agent, or Firm* — Thomas|Kayden

(57) ABSTRACT

The invention discloses a digital demodulating apparatus for timing error detection, including a numerically controlled oscillator, an equalizer unit, a decoder and a timing error detector. The numerically controlled oscillator generates a first sequence signal according to an input sequence signal and a timing error sequence signal. The equalizer unit equalizes the first sequence signal to generate an equalized sequence signal. The decoder decodes the equalized sequence signal to generate to generate an output sequence signal. The timing error detector generates the timing error sequence signal according to the first sequence signal and one of the equalized sequence signal and the output sequence signal.

6 Claims, 2 Drawing Sheets

DIGITAL DEMODULATING APPARATUS FOR TIMING ERROR DETECTION

BACKGROUND OF THE INVENTION

1. Field of the Invention

The invention relates generally to a digital demodulating apparatus for timing error detection, and more particularly, to a digital demodulating apparatus for decision-directed timing error detection capable of calculating a timing error sequence signal with high precision.

2. Description of the Related Art

Decision-directed timing error detection (e.g. Mueller and Muller timing error detection) requires a determined transmit sequence signal to estimate a timing error of a received input sequence signal. Traditionally, the transmit sequence signal is determined and provided by an equalizer, which has high error rate in a multi-path or low Signal-Noise Ratio (SNR) environment. As a result, estimated/calculated timing errors thereof have low precision.

BRIEF SUMMARY OF THE INVENTION

In light of the previously described problem, a digital demodulating apparatus capable of calculating a more precise timing error is required.

The invention discloses a digital demodulating apparatus for timing error detection, comprising a numerically controlled oscillator (NCO), an equalizer unit, a decoder and a timing error detector. The numerically controlled oscillator generates a first sequence signal according to an input sequence signal and a timing error sequence signal. The equalizer unit equalizes the first sequence signal to generate an equalized sequence signal. The decoder decodes the equalized sequence signal to generate an output sequence signal. The timing error detector generates the timing error sequence signal according to the first sequence signal and one of the equalized sequence signal and the output sequence signal.

Furthermore, the invention discloses a digital demodulating apparatus for timing error detection, comprising a numerically controlled oscillator, an equalizer unit comprising an equalizer unit and a slicer, a decoder and a timing error detector. The numerically controlled oscillator generates a first sequence signal according to an input sequence signal and a timing error sequence signal. The equalizer equalizes the first sequence signal to generate an equalized sequence signal according to the sliced sequence signal. The slicer slices the equalized sequence signal to generate the sliced sequence signal according to a reference signal including path metric and trellis-coded modulation information. The decoder decodes the equalized sequence signal to generate an output sequence signal and the reference signal during the decoding phase of the equalized sequence signal. The timing error detector generates the timing error sequence signal according to the first sequence signal and one of the sliced sequence signal, the equalized sequence signal and the output sequence signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
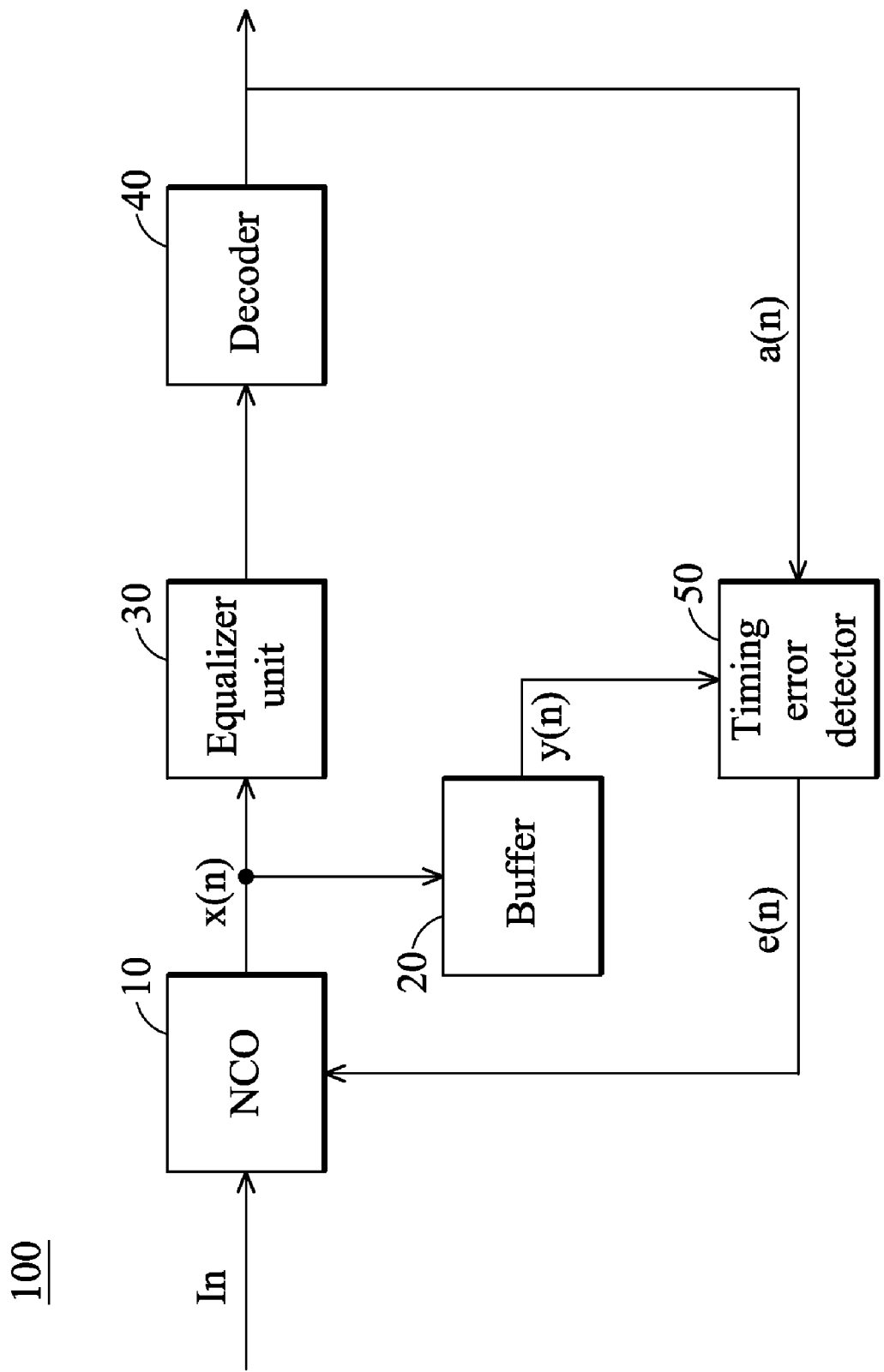
FIG. 1 shows a diagram of a digital demodulating apparatus according to an embodiment of the invention.

FIG. 1 shows a diagram of a digital demodulating apparatus according to an embodiment of the invention. The digital demodulating apparatus 100 for timing error detection comprises a numerically controlled oscillator (NCO) 10, a buffer 20, an equalizer unit 30, a decoder 40 and a timing error detector 50. The NCO 10 receives an input sequence signal In and generates a first sequence signal x(n). The first sequence signal x(n) of the NCO 10 is further sent to the buffer 20 and the equalizer unit 30. The buffer 20 serves a function of latency compensation for the first sequence signal x(n) and outputs a compensated first sequence signal y(n) to the timing error detector 50. The equalizer unit 30 may simply comprise an equalizer (not shown) which eliminates the channel effect of the input sequence signal In generated during the channel transmission and outputs an equalized sequence signal to the decoder 40. The decoder 40 performs a hard decision upon the equalized sequence signal to generate an output sequence signal a(n) for the timing error detector 50. With the compensated first sequence signal y(n) from the buffer 20 and the output sequence signal a(n) from the decoder 40, the timing error detector 50 estimates/calculates a timing error sequence signal e(n) for the NCO 10 to adjust its first sequence signal x(n). It is worthy of noting that the timing error detector 50 may estimate/calculate a timing error sequence signal e(n) for the NCO 10 to adjust the first sequence signal x(n) based on the compensated first sequence signal y(n) from the buffer 20 and the equalized sequence signal from the equalizer unit 30. The decoder 40 may be a Viterbi decoder, but is not limited thereto. The timing error sequence signal e(n) may be calculated using the following formula:

$$e(n) = a(n-1)y(n) - a(n)y(n-1) \quad (A),$$

wherein, the variable a(n−1) is a previous output sequence signal prior to the current output sequence signal a(n) and the variant y(n−1) is in the same principle.

In the embodiment, the decoder 40 provides the output sequence signal a(n) with better precision compared to the equalized sequence signal of the equalizer unit 30. Therefore, the timing error detector 50 is able to estimate/calculate the timing error sequence signal e(n) with high precision.

Figure 2:
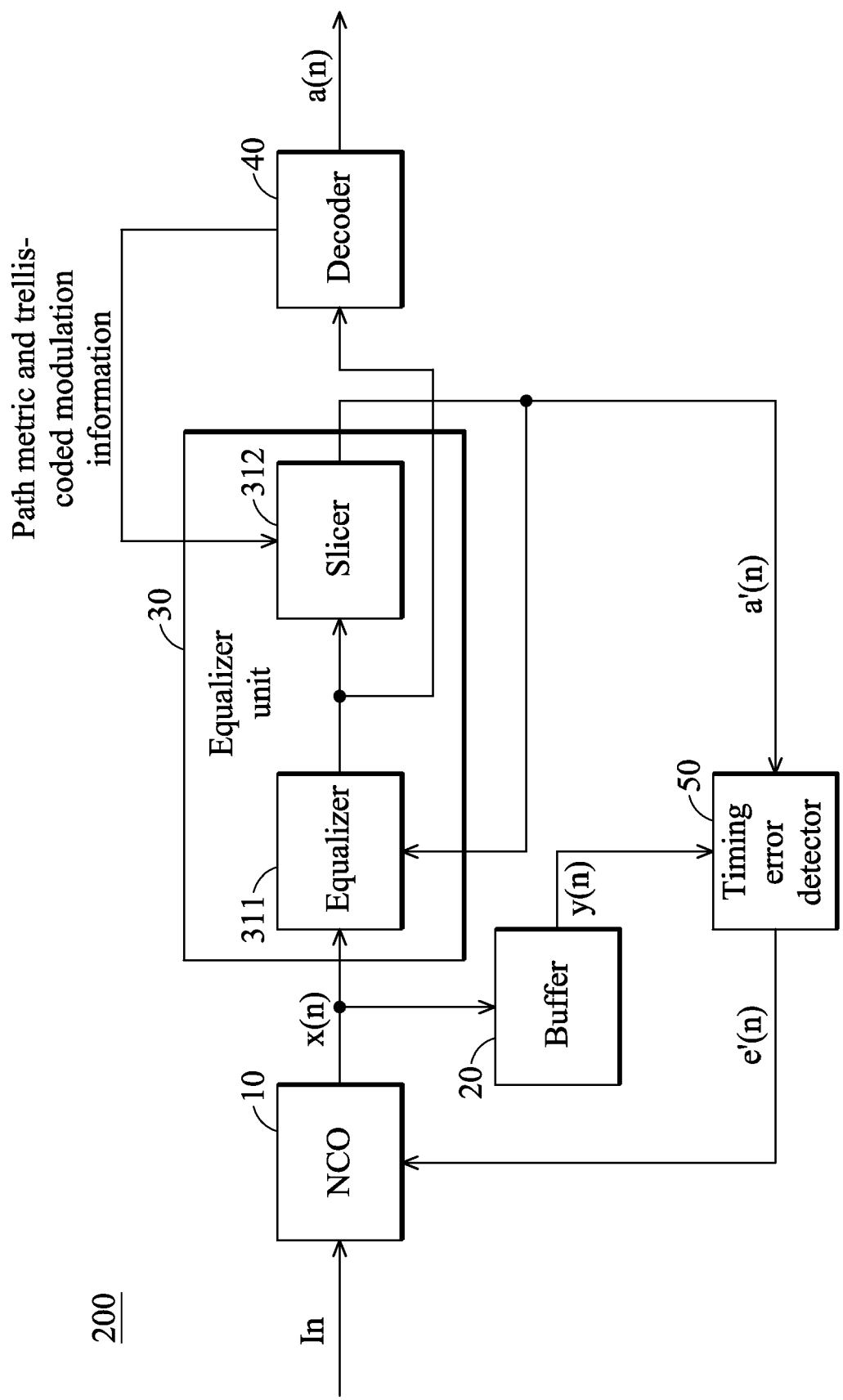
FIG. 2 shows a diagram of a digital demodulating apparatus according to another embodiment of the invention.

FIG. 2 shows a diagram of a digital demodulating apparatus for timing error detection according to another embodiment of the invention. The timing error detection apparatus 200 comprises a NCO 10, a buffer 20, an equalizer unit 31, a decoder 40 and a timing error detector 50, as described in the previous embodiment. Unlike the equalizer unit 30 simply comprising an equalizer in the above embodiment, the equalizer unit 31 may comprise an equalizer 311 and a slicer 312. The decoder 40 receives an equalized sequence signal from the equalizer 311, decodes the sequence signal and generates path metric and trellis-coded modulation information (reference signal) during the decoding phase. At least one of the generated path metric and trellis-coded modulation information is further provided to the slicer 312. By using the information, the slicer 312 generates a sliced sequence signal a'(n) by dynamically adjusting its decision boundary (also called predictive slicer). The sliced sequence signal a'(n) is further provided to the equalizer 311 and the timing error detector 50. The equalizer 311 adjusts the equalized sequence signal based on the sliced sequence signal a'(n). Similar to the above formula (A), the timing error sequence signal e'(n) in this embodiment may be calculated using the following formula:

$$e'(n)=a'(n-1)y(n)-a'(n)y(n-1) \quad (B),$$

wherein, the variable a'(n−1) is a previous sliced sequence signal prior to the current sliced sequence signal a'(n) and the variant y(n−1) is in the same principle. In the embodiment, with the more precise sliced sequence signal a'(n) provided by the slicer 312 and the compensated first sequence signal y(n) from the buffer 20, the timing error detector 50 is able to estimate/calculate the timing error sequence signal e'(n) with better precision. Compared to the previous embodiment, the sliced sequence signal a'(n) is generated by the slicer 312 half way during the generation of the output sequence signal a(n) by the decoder 40. Thus, the second embodiment provides a faster timing error calculation for the timing error detector 50, thereby speeding up the processing of the timing error detection apparatus 200. It is also worthy of noting that the timing error detector 50 may be able to estimate/calculate the timing error sequence signal e'(n) based on the compensated first sequence signal y(n) and one of the output sequence signal a(n) and the equalized sequence signal.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital demodulating apparatus, comprising:
   a numerically controlled oscillator (NCO) generating a first sequence signal according to an input sequence signal and a timing error sequence signal;
   an equalizer unit equalizing the first sequence signal to generate an equalized sequence signal;
   a decoder decoding the equalized sequence signal to generate an output sequence signal;
   a timing error detector generating the timing error sequence signal according to the first sequence signal and one of the equalized sequence signal and the output sequence signal; and
   a buffer buffering the first sequence signal so as to generate a compensated first sequence signal, wherein the timing error detector generates the timing error sequence signal according to the compensated first sequence signal and one of the equalized sequence signal and the output sequence signal,
   wherein the timing error detector generates the timing error sequence signal further according to a previous compensated first sequence signal and one of a previous output sequence signal and a previous equalized sequence signal, and
   wherein the timing error sequence signal is generated according to the following formula:

$$e(n)=a(n-1)y(n)-a(n)y(n-1),$$

wherein e(n) is the timing error sequence signal, a(n) is the output sequence signal, a(n−1) is the previous output sequence signal prior to a(n), y(n) is the compensated first sequence signal, and y(n−1) is the previous compensated first sequence signal prior to y(n).

2. The digital demodulating apparatus as claimed in claim 1, wherein the decoder is a Viterbi decoder.

3. A digital demodulating apparatus, comprising:
   a numerically controlled oscillator (NCO) generating a first sequence signal according to an input sequence signal and a timing error sequence signal;
   an equalizer unit, comprising:
   an equalizer equalizing the first sequence signal to generate an equalized sequence signal according to a sliced sequence signal; and
   a slicer slicing the equalized sequence signal to generate the sliced sequence signal according to a reference signal;
   a decoder decoding the equalized sequence signal to generate an output sequence signal and the reference signal during the decoding phase of the equalized sequence signal;
   a timing error detector generating the timing error sequence signal according to the first sequence signal and one of the sliced sequence signal, the equalized sequence signal and the output sequence signal; and
   a buffer buffering the first sequence signal so as to generate a compensated first sequence signal, wherein the timing error detector generates the timing error sequence signal according to the compensated first sequence signal and one of the sliced sequence signal, the equalized sequence signal and the output sequence signal,
   wherein the timing error detector generates the timing error sequence signal further according to a previous compensated first sequence signal and one of a previous sliced sequence signal, a previous equalized sequence signal and a previous output sequence signal, and
   wherein the timing error sequence signal is generated according to the following formula:

$$e'(n)=a'(n-1)y(n)-a'(n)y(n-1),$$

wherein e'(n) is the timing error sequence signal, a'(n) is the sliced sequence signal, a'(n−1) is the previous sliced sequence signal prior to a'(n), y(n) is the compensated first sequence signal, and y(n−1) is the previous compensated first sequence signal prior to y(n).

4. The digital demodulating apparatus as claimed in claim 3, wherein the decoder is a Viterbi decoder.

5. The digital demodulating apparatus as claimed in claim 3, wherein the reference signal includes path metric and trellis-coded modulation information.

6. The digital demodulating apparatus as claimed in claim 3, wherein the slicer further changes its decision boundary according to the reference signal.

* * * * *